Figure 1:
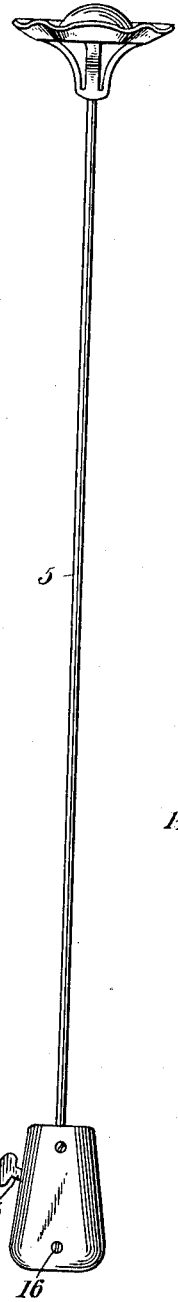

J. W. BIERACKI.
GUARD FOR HAT PINS.
APPLICATION FILED JULY 15, 1911.

1,022,120.

Patented Apr. 2, 1912.

INVENTOR.
John W. Bieracki

UNITED STATES PATENT OFFICE.

JOHN W. BIERACKI, OF NEW HAVEN, CONNECTICUT.

GUARD FOR HAT-PINS.

1,022,120.  Specification of Letters Patent.  Patented Apr. 2, 1912.

Application filed July 15, 1911. Serial No. 638,632.

*To all whom it may concern:*

Be it known that I, JOHN W. BIERACKI, a subject of the Emperor of Austria-Hungary, residing at New Haven, in the county of New Haven and State of Connecticut, have invented certain new and useful Improvements in Guards for Hat-Pins, of which the following is a specification, reference being had therein to the accompanying drawing.

This invention relates to a guard for hat pins, and the object of my invention is to provide a guard that will serve frictionally as a protector for the pointed end of a hat pin, and as a lock for preventing a hat pin from becoming accidentally displaced from a hat.

I attain the above object by providing the pointed end of a pin with a detachable head that is easily and quickly placed in position and adjusted to frictionally engage the pointed end of a pin, whereby the head cannot become accidentally displaced. The gripping mechanism of the head comprises a pin having one end thereof provided with a cam surface, and the opposite end thereof with a lever which is shifted to cause the cam surface of the pin to engage the hat pin and bind the hat pin within the detachable head.

The invention will be hereinafter specifically described and then claimed, and reference will now be had to the drawing, wherein:—

Figure 2:
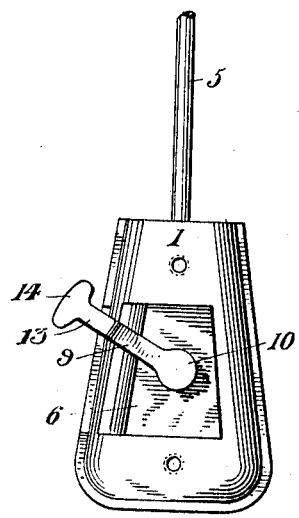
Figure 3:
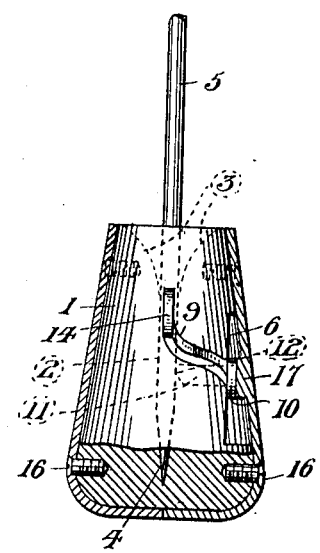
Figure 4:
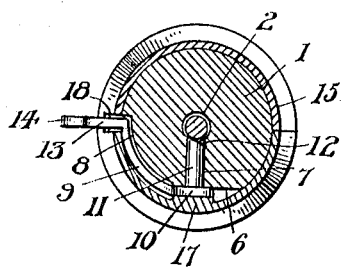
Figure 6:
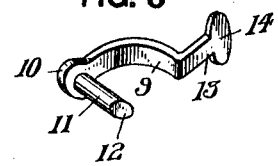
Figure 5:
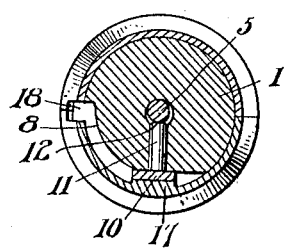

Figure 1 is an elevation of a hat pin provided with a guard; Fig. 2 is an enlarged front elevation of a portion of the guard with a part of the shell thereof removed; Fig. 3 is a side elevation of the same partly broken away and partly in section; Fig. 4 is a horizontal sectional view of the guard, showing the same loosely mounted upon a portion of the pin; Fig. 5 is a similar view showing the guard gripping a portion of the pin, and Fig. 6 is a perspective view of a detached cam pin.

A guard in accordance with this invention comprises a head 1, tapering outwardly from the inner end thereof to the outer end, and this head has a longitudinal bore 2 with the end thereof at the small end of the head 1 flared, as at 3, and the opposite end thereof tapered, as at 4, in proximity to the large end of the head 1. This bore is adapted to receive the pointed end of a hat pin 5, and said bore is of a greater diameter than the diameter of the pin.

The side of the head 1, intermediate the ends thereof, is provided with a recess 6, in communication with the bore 2, by a radially disposed opening 7. The recess 6 is in the front side of the head and extends around to one side of the head, as at 8, to provide clearance for a curved lever 9. This lever has the inner end thereof provided with a head 10 and a cam pin 11, said cam pin being arranged at right angles to the head 10, and extending in the opening 7 with the inner end thereof provided with a cam surface 12 formed by beveling the end of the pin. The outer end of the lever 9 is bent outwardly, as at 13, and provided with a handle 14.

Surrounding the sides and outer ends of the head 1 is a sectional shell 15 secured to the head 1 by screws 16, or other fastening means. The section of the shell confronting the recess 6 has a bearing 17 for the head 10, and the confronting edges of said section are cut away to form a vertical slot 18 providing clearance for the outer end of a lever 9. With the lever 9 in a lowered position, the head 1 can be easily placed upon the pin 5, and when the lever 9 is raised, the cam surface of the pin 11 engages the pin 5 and shifts it into engagement with the wall of the bore 2, binding the pin 5 therein and preventing its accidental displacement.

The sectional shell 15 retains the gripping mechanism in position and this shell is susceptible to any desired ornamentation.

What I claim is:—

A guard for the pointed end of a hat pin, comprising a tapering head having a centrally disposed bore for the reception of the pointed end of the pin, said head having its periphery cut away to provide a recess and said head further formed with a radially disposed opening communicating at one end with the bore and at its other end with said recess, a cam pin shiftably mounted in said opening and extending in the bore for engagement, when shifted in one direction, with the pointed end of a pin for securing the head on the latter, a curved lever mounted in the recess and connected at one end to said cam pin, a handle disposed at right angles with respect, and connected, to the other end of said lever, said recess being of such length as to permit of the elevating and lowering of said lever, and means for retaining said lever in position.

In testimony whereof I affix my signature in the presence of two witnesses.

JOHN W. BIERACKI.

Witnesses:
WOOLF LEVY,
JOSIAH W. LEVY.

Copies of this patent may be obtained for five cents each, by addressing the "Commissioner of Patents, Washington, D. C."